(12) United States Patent
Bae et al.

(10) Patent No.: US 8,345,183 B2
(45) Date of Patent: Jan. 1, 2013

(54) BACKLIGHT UNIT AND IMAGE DISPLAY APPARATUS EMPLOYING THE SAME

(75) Inventors: Min-jong Bae, Yongin-si (KR); Yong-Chul Kim, Yongin-si (KR); Deuk-seok Chung, Yongin-si (KR); Ho-Suk Kang, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 863 days.

(21) Appl. No.: 12/213,865

(22) Filed: Jun. 25, 2008

(65) Prior Publication Data

US 2009/0040423 A1 Feb. 12, 2009

(30) Foreign Application Priority Data

Aug. 9, 2007 (KR) .......................... 10-2007-0080342

(51) Int. Cl.
*G02F 1/133* (2006.01)
*G02F 1/1335* (2006.01)
*G09F 13/04* (2006.01)
*G09F 13/08* (2006.01)
*F21V 1/00* (2006.01)
*F21V 11/00* (2006.01)

(52) U.S. Cl. ................ 349/62; 349/31; 349/64; 349/65; 349/70; 349/71; 362/97.1; 362/97.2; 362/235; 362/248

(58) Field of Classification Search ..................... 349/31, 349/62, 64, 65, 70, 71, 61; 362/97.1, 97.2, 362/235, 248, 260, 606–608, 611, 613, 614
See application file for complete search history.

(56) References Cited

U.S. PATENT DOCUMENTS

| | | | |
|---|---|---|---|
| 6,195,196 B1 * | 2/2001 | Kimura et al. | 359/295 |
| 2002/0109804 A1 * | 8/2002 | Tsubokura et al. | 349/58 |
| 2004/0114372 A1 * | 6/2004 | Han et al. | 362/330 |
| 2005/0225240 A1 * | 10/2005 | Min et al. | 313/582 |
| 2006/0001821 A1 * | 1/2006 | Dewa et al. | 349/150 |
| 2006/0113892 A1 * | 6/2006 | Jung et al. | 313/497 |
| 2006/0132672 A1 * | 6/2006 | Shih et al. | 349/64 |
| 2007/0109464 A1 * | 5/2007 | Jung et al. | 349/65 |
| 2008/0018836 A1 * | 1/2008 | Huh et al. | 349/106 |
| 2009/0185110 A1 * | 7/2009 | Gorog et al. | 349/71 |
| 2009/0251641 A1 * | 10/2009 | Sumiyoshi et al. | 349/70 |

* cited by examiner

*Primary Examiner* — Jerry Blevins
(74) *Attorney, Agent, or Firm* — Robert E. Bushnell, Esq.

(57) ABSTRACT

A backlight unit that can perform local dimming, and has a structure for preventing light leakage and a cooling structure, and an image display apparatus employing the backlight unit. The backlight unit includes a light emitting arrangement adapted to radiate light and a plurality of light shielding guides adapted to divide the light emitting arrangement into a plurality of unit blocks, the unit blocks being adapted to provide local dimming, the light shielding guides being further adapted to prevent light from traveling from one of said unit blocks to another of said unit blocks.

8 Claims, 3 Drawing Sheets

BACKLIGHT UNIT AND IMAGE DISPLAY APPARATUS EMPLOYING THE SAME

CLAIM OF PRIORITY

This application makes reference to, incorporates the same herein, and claims all benefits accruing under 35 U.S.C. §119 from an application for BACKLIGHT UNIT AND IMAGE DISPLAY APPARATUS EMPLOYING THE SAME earlier filed in the Korean Intellectual Property Office on 9 Aug. 2007 and there duly assigned Serial No. 10-2007-0080342.

BACKGROUND OF THE INVENTION

1. Field of the Invention

The present invention relates to a backlight unit that can perform local dimming, has a structure that prevents light leakage and has a structure for cooling, and an image display apparatus employing the backlight unit.

2. Description of the Related Art

Recently, image display apparatuses, using a backlight unit, have been employing a local dimming technique by turning off dark image areas in the backlight unit to improve the contrast ratio in a region between a bright area and a dark area. The backlight unit capable of performing the local dimming can be classified as a carbon nanotube (CNT)-backlight unit using a CNT as an emitter or as a light emitting diode (LED)-backlight unit using a LED as a point light source.

A CNT-backlight unit includes a rear substrate, CNT emitters, a front substrate that is transparent, and a fluorescent layer that is arranged on a lower surface of the front substrate. Black matrixes, that are used to divide the fluorescent layer into unit blocks that are for local dimming, are arranged in the fluorescent layer. An anode is arranged between the fluorescent layer, that is a light emitting unit, and the front substrate. Also, the CNT-backlight unit can further include a diffusion plate to uniformly emitting light. Light uniformly emitted through the diffusion plate is provided to a display panel, such as a liquid crystal display (LCD) panel.

An LED-backlight unit includes a base, a plurality of point light sources arranged on the base, and a diffusion plate facing the point light sources. In the LED-backlight unit, the point light sources are mainly LEDs and are arranged in a two-dimensional array on the base. Some of the point light sources are gathered to form unit blocks, that are for local dimming. In this case, the point light sources that are included in one unit block flicker together. The diffusion plate uniformly emits light radiated from the point light sources to a display panel, such as a Liquid Crystal Display (LCD) panel.

However, in the CNT-backlight unit and the LED-backlight unit, light leakage occurs when light reaches the diffusion plates during local dimming, thereby influencing adjacent blocks. As a result, the contrast ratio is decreased in the boundary between the blocks. In the case of the CNT-backlight unit, a temperature of an anode (not shown) of a light emitting unit is increased to more than 80° C. Accordingly, if the anode is not cooled, the CNT-backlight unit can be damaged due to thermal shock.

SUMMARY OF THE INVENTION

The present invention provides a backlight unit that can perform local dimming, and has a structure for preventing light leakage as well as a structure for cooling, and an image display apparatus employing the backlight unit.

According to one aspect of the present invention, there is provided a backlight unit that includes a light emitting arrangement adapted to radiate light; and a plurality of light shielding guides adapted to divide the light emitting arrangement into a plurality of unit blocks, the unit blocks being adapted to provide local dimming, the light shielding guides being further adapted to prevent light from traveling from one of said unit blocks to another of said unit blocks. The light emitting arrangement includes a rear substrate, a plurality of emitters arranged on the rear substrate and adapted to radiate an electron beam, a transparent front substrate arranged to face the rear substrate, and a fluorescent layer arranged on a lower surface of the front substrate and facing with the rear substrate, wherein the light shielding guides are arranged on an upper surface of the front substrate.

The light shielding guides can be arranged in a tetragonal lattice arrangement on an entire upper surface of the front substrate. The light shielding guides can be further adapted to radiate heat generated by the light emitting arrangement by having a high thermal conductivity. The light shielding guides can include one of graphite, a conducting polymer and carbon black.

The backlight unit can also include a housing and a metal plate adapted to radiate heat generated by the light emitting arrangement to an outside by being attached to edges of the light shielding guide and by being arranged on an outside of the housing of the backlight unit. A height of ones of the plurality of light shielding guides can be in a range of 1 mm to 10 mm. The emitters can be made out of carbon nanotubes. The backlight unit can also include a plurality of black matrixes arranged in the fluorescent layer and adapted to divide the fluorescent layer into a plurality of unit blocks. The backlight unit can also include a diffusion plate adapted to produce uniformity in light radiated from the light emitting arrangement.

The light emitting unit can also include a base and a plurality of point light sources arranged in a two-dimensional array on the base, wherein the plurality of light shielding guides are arranged on the base between ones of the point light sources. The plurality of light shielding guides can be arranged in a tetragonal lattice arrangement. The height of ones of the light shielding guides can be in a range of 3 mm to 5 cm. Ones of the plurality of point light sources can be one of a light emitting diode (LED) and a laser diode (LD). The backlight unit can also include a diffusion plate adapted to produce uniformity in light radiated from the light emitting arrangement.

According to another aspect of the present invention, there is provided an image display apparatus that includes a backlight unit and a display panel adapted to produce an image by using light radiated from the backlight unit, wherein the backlight unit can include a light emitting arrangement and a plurality of light shielding guides adapted to divide the light emitting arrangement into a plurality of unit blocks that are adapted to provide local dimming, the light shielding guides being further adapted to prevent light from traveling from one of said unit blocks to another of said unit blocks. The display panel can be a liquid crystal display panel.

The light emitting arrangement can include a rear substrate, a plurality of emitters arranged on the rear substrate and adapted to radiate an electron beam, a transparent front substrate arranged to face the rear substrate, and a fluorescent layer arranged on a lower surface of the front substrate and facing with the rear substrate, wherein the light shielding guides are arranged on an upper surface of the front substrate. The light shielding guides can be arranged in a tetragonal lattice arrangement on an entire upper surface of the front substrate. The light shielding guides can be further adapted to radiate heat generated by the light emitting arrangement by having a high thermal conductivity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in that like reference symbols indicate the same or similar components, wherein.

DETAILED DESCRIPTION OF THE INVENTION

Figure 1:
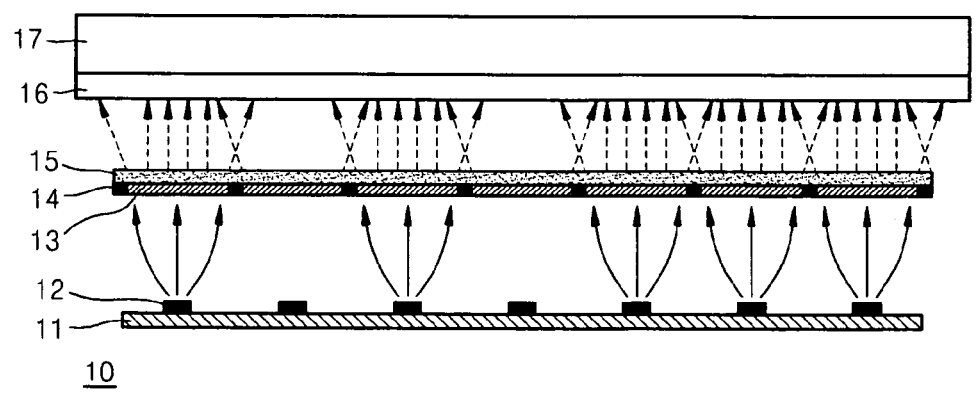
FIG. 1 is a schematic cross-sectional view illustrating a structure of a carbon nanotube (CNT) backlight unit.

Turning now to the figures, FIG. 1 is a schematic cross-sectional view illustrating an example of a CNT-backlight unit 10. Referring to FIG. 1, the CNT-backlight unit 10 includes a rear substrate 11, CNT emitters 12, a front substrate 15 that is transparent, and a fluorescent layer 13 that is arranged on a lower surface of the front substrate 15. Black matrixes 14, that are used to divide the fluorescent layer 13 into unit blocks that are for local dimming, are arranged in the fluorescent layer 13. Although it is not shown in the drawing, an anode is arranged between the fluorescent layer 13, that is a light emitting unit, and the front substrate 15. Also, the CNT-backlight unit 10 can further include a diffusion plate 16 for uniformly emitting light. Light uniformly emitted through the diffusion plate 16 is provided to a display panel 17, such as a liquid crystal display (LCD) panel.

Figure 2:
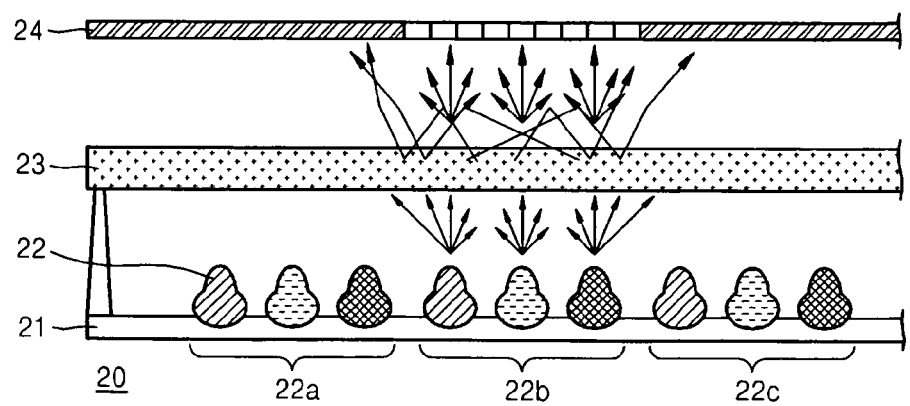
FIG. 2 is a schematic cross-sectional view illustrating a structure of a light emitting diode (LED) backlight unit.

Turning now to FIG. 2, FIG. 2 is a schematic cross-sectional view illustrating an example of a Light Emitting Diode (LED)-backlight unit. Referring to FIG. 2, a LED-backlight unit 20 includes a base 21, a plurality of point light sources 22 arranged on the base 21, and a diffusion plate 23 facing the point light sources 22. In the LED-backlight unit 20, the point light sources 22 are mainly LEDs and are arranged in a two-dimensional array on the base 21. Some of the point light sources 22 are gathered to form unit blocks 22a, 22b, and 22c, that are for local dimming. In this case, the point light sources 22 that are included in one unit block flicker together. The diffusion plate 23 uniformly emits light radiated from the point light sources 22 to a display panel 24, such as a Liquid Crystal Display (LCD) panel.

However, in the CNT-backlight unit 10 and the LED-backlight unit 20 of FIGS. 1 and 2, light leakage occurs when light reaches the diffusion plates 16 and 23 during local dimming, thereby influencing adjacent blocks. As a result, the contrast ratio is decreased in the boundary between the blocks. In the case of the CNT-backlight unit 10, a temperature in an anode (not shown) of a light emitting unit is increased to more than 80° C. Accordingly, if the anode is not cooled, the CNT-backlight unit 10 can be damaged due to thermal shock.

Figure 3:
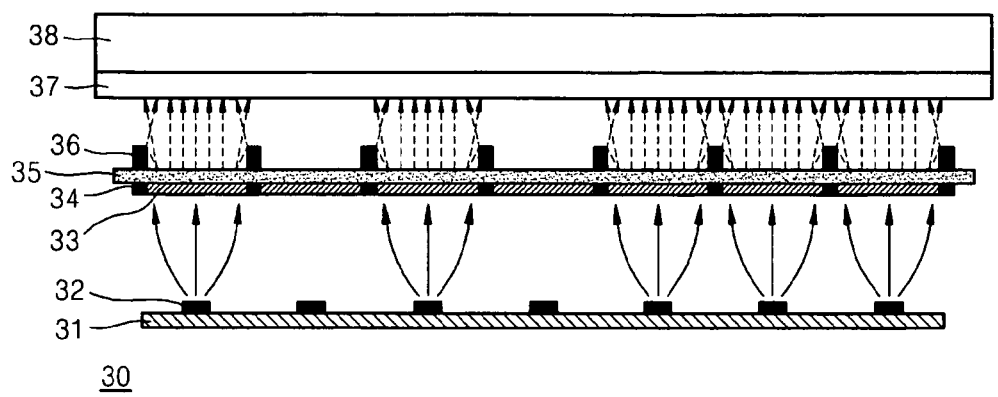
FIG. 3 is a schematic cross-sectional view illustrating a structure of a backlight unit using a CNT according to an embodiment of the present invention.

Turning now to FIG. 3, FIG. 3 is a schematic cross-sectional view illustrating a structure of a backlight unit 30 according to an embodiment of the present invention. The backlight unit 30, that has a light emitting arrangement shown in FIG. 3, is a carbon nanotube (CNT)-backlight unit using an emitter made out of, for example, a CNT. The light emitting arrangement of the CNT-backlight unit uses the same principle as that of a field emission display (FED). That is, the light emitting arrangement of the backlight unit 30 according to the present embodiment of the present invention, uses a principle in that electrons emitted from a CNT emitter excite a fluorescent layer.

Referring to FIG. 3, the backlight unit 30 according to the present embodiment of the present invention includes a rear substrate 31, emitters 32 arranged on the rear substrate 31, a front substrate 35 that is transparent, can be made out of glass and faces the rear substrate 31, a fluorescent layer 33 arranged on a lower surface of the front substrate 35, and light shielding guides 36 arranged on an upper surface of the front substrate 35. In the present embodiment, the rear substrate 31, emitters 32, the fluorescent layer 33, and the front substrate 35 form a light emitting arrangement of the backlight unit 30. The backlight unit 30 can further include a diffusion plate 37 in order for light emitted from the light emitting arrangement to be uniform. Although it is not shown in the drawing, a cathode and gate electrode are further included on the rear substrate 31 in order to control the emission of electrons from the emitters 32, and an anode (not shown) is further arranged between the front substrate 35 and the fluorescent layer 33 in order to receive the electrons emitted from the emitters 32. Since this technology is well known to one skilled in the art, a detailed description thereof will be omitted. The emitter 32 can be a metal probe having a sharp tip, however it is preferable to use a CNT as an emitter.

The fluorescent layer 33 can further include black matrixes 34 for dividing the fluorescent layer 33 into unit blocks that are for local dimming. For convenience of explanation, FIG. 3 shows only one emitter 32 included in one unit block, however, the number of the emitters 32 per unit block can vary according to design. For example, the size of the unit block can be about 1 cm×1 cm, and a plurality of emitters 32 can be arranged in a unit block.

Figure 4:
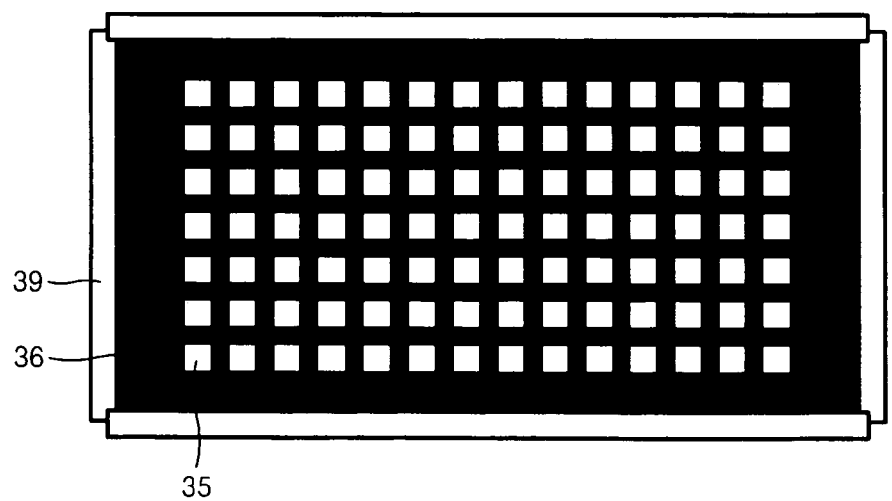
FIG. 4 is a schematic plan view illustrating a structure of the light shielding guide shown FIG. 3.

The light shielding guides 36, arranged on the upper surface of the front substrate 35, divide the light emitting arrangement of the backlight unit 30 into unit blocks that are for local dimming, and prevent light from leaking from one unit block to another. Accordingly, the light shielding guides 36 can be arranged to correspond with the black matrixes 34. However, under different conditions, the light shielding guides 36 can be arranged to be smaller or bigger than the black matrixes 34. As shown in FIG. 4, the light shielding guides 36 can be arranged in a tetragonal lattice arranged on the entire upper surface of the front substrate 35 in order to divide the light emitting arrangement of the backlight unit 30 into the unit blocks for local dimming. For example, the size of each tetragonal lattice can be the same as that of a unit block.

In the present embodiment, to firmly shield light between the unit blocks, the light shielding guides 36 should be tall enough. For example, the height of the light shielding guide 36 can be preferably in a range of 1 mm to 10 mm and can be appropriately varied according to the interval between the front substrate 35 and the diffusion plate 37. If the light shielding guides 36 directly contact the diffusion plate 37, perfect shielding of light can be achieved. However, in such case, there is a possibility that the light shielding guides 36 can be seen from the outside. Accordingly, it is preferred that the light shielding guides 36 be slightly separated from the diffusion plate 37 without actually contacting with the diffusion plate 37.

As described above, in the case of the CNT-backlight unit, a temperature of the anode on the fluorescent layer 33 increases to more than 80° C., and accordingly, it is necessary to cool the CNT-backlight unit. According to the present embodiment, the light shielding guides 36 can serve to cool the backlight unit 30 by radiating heat generated in the light emitting arrangement of the backlight unit 30 to the outside. In order to do this, the light shielding guides 36 can be made out of material having a high thermal conductivity, a low reflectivity and can be either of a film type or be produced by directly printing on the front substrate 35. For example, the light shielding guides 36 can be made of graphite, conductive polymer, carbon black, or the like.

Figure 5:
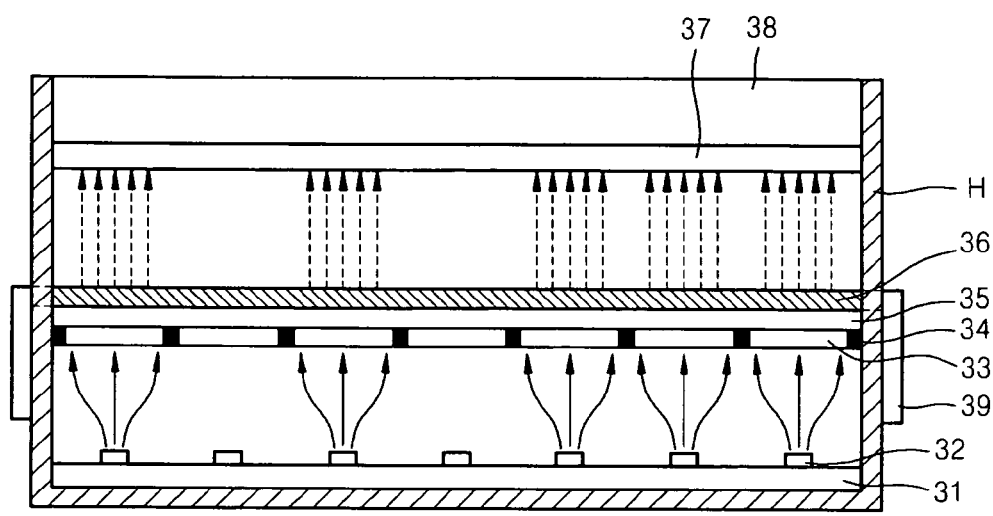
FIG. 5 is a schematic cross-sectional view illustrating an image display apparatus that includes the CNT backlight unit of FIG. 3 as well as a cooling unit.

To further improve a cooling effect, a metal plate 39 having a high thermal conductivity can be further connected to edges of the light shielding guides 36. As shown in FIG. 5, the metal plate 39 can radiate heat generated in the light emitting arrangement to the outside by being connected to housing H on an exterior of the backlight unit 30 and on edges of the light shielding guide 36.

Referring to FIG. 3, the backlight unit 30, that has the above-described structure and a non-emissive display panel 38, such as a liquid crystal display panel that is arranged on diffusion plate 37 within the housing H, can form an image display apparatus. The backlight unit 30 provides light to the display panel 38 by using a local dimming technique, and the display panel 38 forms an image by using the light provided from the backlight unit 30. According to the present invention, by preventing light from leaking from one unit block to another, in the backlight unit 30 using the light shielding guides 36, a contrast ratio in a region between a bright area and a dark area of the display panel 38 can be improved. Also, the light shielding guides 36 can reduce thermal shock generated in the backlight unit 30 by radiating heat generated in the backlight unit 30 to the outside.

Figure 6:
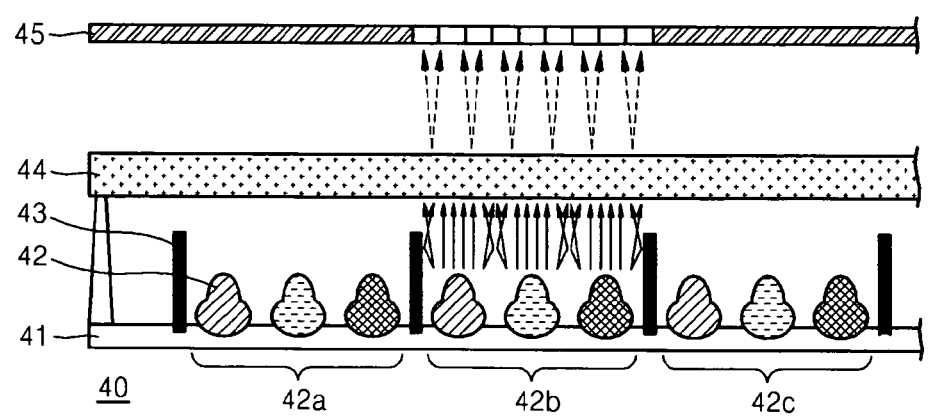
FIG. 6 is a schematic cross-sectional view illustrating a structure of a backlight unit using a light emitting diode according to an embodiment of the present invention.

Turning now to FIG. 6, FIG. 6 is a schematic cross-sectional view illustrating a structure of a backlight unit 40, according to another embodiment of the present invention. The backlight unit 40 shown in FIG. 6 that has a light emitting arrangement, is a direct-lighting backlight unit using a light emitting diode (LED) or laser diode (LD). Referring to FIG. 6, the backlight unit 40 according to the present embodiment of the present invention includes a base 41, a plurality of point light sources 42 arranged on the base 41, light shielding guides 43 arranged between the point light sources 42, and a diffusion plate 44 facing the point light sources 42. In the present embodiment, the base 41 and the point light sources 42 form a light emitting arrangement of the backlight unit 40.

According to the present invention, the base 41 can be a substrate, for example, a print circuit board (PCB). As described above, the point light sources 42 are mainly LEDs or laser diodes (LDs) and are arranged in a two-dimensional array on the base 41.

As shown in FIG. 6, some of the point light sources 42 are gathered to form unit blocks 42a, 42b, and 42c that are for local dimming. According to the present invention, the light shielding guides 43 can be preferably arranged on the base 41 between the unit blocks 42a, 42b, and 42c. As with light shielding guides 36 of FIG. 4, the light shielding guides 43 according to the present embodiment can be also arranged in the tetragonal lattice form of FIG. 4. In the present embodiment, to firmly shield light from traveling between the unit blocks 42a, 42b, 42c, the light shielding guides 43 should be designed to be sufficiently tall. For example, the height of the light shielding guides 43 can be preferably in a range of 3 mm to 5 cm and can be appropriately varied according to the interval between the base 41 and the diffusion plate 44.

As shown in FIG. 6, the backlight unit 40, that has the above-described structure, and a non-emissive display panel 45, such as a liquid crystal display panel, can form an image display apparatus. The backlight unit 40 provides light to the display panel 45 by using a local dimming technique, and the display panel 45 forms an image by using light provided from the backlight unit 40. As described above, according to the present invention, by preventing light from traveling from one unit block 42a, 42b, and 42c to another, the contrast ratio in a region between a bright area and a dark area of the display panel 45 can be improved.

According to the present invention, by preventing light from leaking from one unit block to another, the contrast ratio in a region between a bright area and a dark area can be improved. Also, according to the present invention, in the case of a CNT-backlight unit, thermal shock generated in the backlight unit can be reduced by radiating heat generated in an anode to the outside.

While the present invention has been particularly shown and described with reference to exemplary embodiments thereof, it will be understood by one of ordinary skill in the art that various changes in form and details can be made therein without departing from the spirit and scope of the present invention as defined by the following claims.

What is claimed is:

1. A backlight unit, comprising:
a light emitting arrangement adapted to radiate light, the light emitting arrangement includes:
   a rear substrate, a plurality of emitters arranged on the rear substrate and adapted to radiate an electron beam,
   a transparent front substrate arranged to face the rear substrate and
   a fluorescent layer arranged on a lower surface of the front substrate and facing with the rear substrate, wherein the light shielding guides are arranged on an upper surface of the front substrate; and
a plurality of light shielding guides adapted to divide the light emitting arrangement into a plurality of unit blocks, the unit blocks being adapted to provide local dimming, the light shielding guides being further adapted to prevent light from traveling from one of said unit blocks to another of said unit blocks, wherein the light shielding guides are arranged in a tetragonal lattice arrangement on an entire upper surface of the front substrate, wherein the light shielding guides are further adapted to radiate heat generated by the light emitting arrangement by having a high thermal conductivity.

2. The backlight unit of claim 1, wherein the light shielding guides are comprised of an element selected from a group consisting of graphite, a conducting polymer and carbon black.

3. The backlight unit of claim 2, further comprising a housing and a metal plate adapted to radiate heat generated by the light emitting arrangement to an outside by being attached to edges of the light shielding guide and by being arranged on an outside of the housing of the backlight unit, wherein the light shielding guides extend through a light emitting portion of the backlight unit and the metal plate is external to the light emitting portion of the backlight.

4. The backlight unit of claim 1, further comprising a housing and a metal plate adapted to radiate heat generated by the light emitting arrangement to an outside by being attached to edges of the light shielding guide and by being arranged on an outside of the housing of the backlight unit.

5. The backlight unit of claim 4, wherein the light shielding guides extend through a light emitting portion of the backlight unit and the metal plate is external to the light emitting portion of the backlight.

6. The backlight unit of claim 1, wherein a height of ones of the plurality of light shielding guides being in a range of 1 mm to 10 mm.

7. The backlight unit of claim 1, wherein the fluorescent layer is arranged directly on the lower surface of the front substrate.

8. The backlight unit of claim 1, wherein the emitters are carbon nanotube emitters.

\* \* \* \* \*